US011964819B2

(12) United States Patent
O'Keefe

(10) Patent No.: US 11,964,819 B2
(45) Date of Patent: Apr. 23, 2024

(54) VERSATILE PORTABLE WASTE MANAGEMENT SYSTEM

(71) Applicant: The O'Keefe Group, Inc., Attleboro, MA (US)

(72) Inventor: Michael J. O'Keefe, Attleboro, MA (US)

(*) Notice: Subject to any disclaimer, the term of this patent is extended or adjusted under 35 U.S.C. 154(b) by 522 days.

(21) Appl. No.: 17/223,245

(22) Filed: Apr. 6, 2021

(65) Prior Publication Data

US 2021/0309456 A1 Oct. 7, 2021

Related U.S. Application Data

(60) Provisional application No. 63/005,666, filed on Apr. 6, 2020.

(51) Int. Cl.

| | |
|---|---|
| ***B30B 9/30*** | (2006.01) |
| ***B65F 1/14*** | (2006.01) |
| ***B65F 3/14*** | (2006.01) |

(52) U.S. Cl.

CPC .............. *B65F 3/14* (2013.01); *B30B 9/3046* (2013.01); *B65F 1/1405* (2013.01); *B65F 1/1473* (2013.01); *B65F 2210/12* (2013.01)

(58) Field of Classification Search

CPC .. B30B 9/3046; B65F 1/02; B65F 1/12; B65F 1/1405; B65F 1/1468; B65F 1/1473; B65F 3/14; B65F 2210/12; B65F 2210/148; B65D 90/0033

See application file for complete search history.

(56) References Cited

U.S. PATENT DOCUMENTS

| | | | | |
|---|---|---|---|---|
| 3,318,231 A * | 5/1967 | Felts | B30B 9/3057 | 100/229 A |
| 5,058,957 A * | 10/1991 | Fell | B65F 1/0033 | 220/908 |
| 8,220,859 B2 * | 7/2012 | Reeder | B60J 7/085 | 296/98 |
| 2014/0299007 A1 * | 10/2014 | Colombo | B30B 13/00 | 100/35 |
| 2015/0047516 A1 * | 2/2015 | Williams | B30B 9/3021 | 100/35 |
| 2019/0293478 A1 * | 9/2019 | Waite | G01G 23/18 | |

FOREIGN PATENT DOCUMENTS

| | | | |
|---|---|---|---|
| GB | 2535281 A * | 8/2016 | A01D 90/02 |

* cited by examiner

*Primary Examiner* — Jimmy T Nguyen

(74) *Attorney, Agent, or Firm* — FisherBroyles LLP; Kevin D. Jablonski

(57) ABSTRACT

A waste management system having improved maneuverability and versatility. The system includes a container bay configured to house a compactor unit having a receptacle body configured to receive waste in a cavity surrounded by container walls and a tow member affixed to a forward container wall, the tow member. The tow member is disposed in close proximity to the front wall in order to provide better maneuverability when maneuvered by a deployment vehicle. Typically, first and second of the tow member converge at a tow engagement mechanism disposed at a distance from the forward container wall that is equal to or less than one tenth of a length of the container. The system may further include a local control station situated at the container bay and configured to engage with waste container such that the control station may control functionality of the compactor unit.

8 Claims, 5 Drawing Sheets

VERSATILE PORTABLE WASTE MANAGEMENT SYSTEM

PRIORITY CLAIM

This application claims the benefit of U.S. Provisional Application No. 63/005,666, entitled "VERSATILE PORTABLE WASTE MANAGEMENT SYSTEM", filed Apr. 6, 2021, which is incorporated by reference in its entirety herein for all purposes.

BACKGROUND

Modern society and modern cities require trash and waste management systems that can be easily manufactured, maneuvered, deployed, and retrieved for a great number of in-field applications and settings. For example, metropolitan businesses and industrial settings generate a large amount of trash and waste that may be stored in larger receptacles prior to retrieval and disposal and larger transfer facilities and disposal sites. As space is always a premium in metropolitan areas, smaller footprint solutions offer the benefits of reduced space use as well as portability for deployment and retrieval. Further, receptacles that offer compaction can increase the overall payload for each deployment and retrieval cycle.

Conventional solutions may include trash compaction units with tow features and trailer features. In some conventional solutions, a compactor unit may be towed and placed into a deployment space using a conventional tongue and hitch arrangement. In other conventional solutions, the compactor unit may be winched onto and off of a bed of a truck by engaging deployment/re-engagement members disposed on a front side of a compactor unit. However, in some deployable spaces that require a sharp turn because of a narrow alleyway or any other impediment requiring a substantially 90-degree turn into a deployed space, such conventional solutions do not allow for deployment under tight space conditions as the vehicle would likely impact the impediments.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown but is to be accorded the widest scope consistent with the principles and features disclosed or suggested herein.

The subject matter disclosed herein is related to a portable and versatile waste management system. In an embodiment, the waste management system may be a compactor set is a form factor that includes a rectangular shape suited for transport on the bed of a truck. Having a transportable form factor enhances the portability and versatility of the compactor system. Additionally, the form factor may include casters situated at the base of the compactor thereby allowing the compactor to be maneuvered in free space once deployed from the truck bed used for transport as well as skid rails suited to assist in onboarding and offboarding to and from the transport truck.

As alluded to in the background, a compactor of this form factor is able to fit into several deployment spaces, however, the truck upon which the compactor is transported may be too large and less maneuverable in tight spaces. Thus, in an embodiment, the compactor includes a tongue attached to a first side of the compactor. The tongue may also be deployable through a folding up or down action such that the tongue may be folded up in a stowed position to reduce interference with operation. When need, the tongue may be folded down and provide an attachment point for any vehicle having a hitch suited to engage the compactor tongue. By engaging the compactor at a maneuvering point while not engaged on a transport truck, the compactor may be more easily maneuvered within tight spaces. That is, without adding the length of a truck and transport bed to the dimensions for making 45-90 degree turns, the compactor may be placed into waste receptacle spaces in tight alley spaces in metropolitan areas as well as small receptacle corridors in tight industrial settings.

In additional embodiments, the versatile compactor may include more than one deployable tongue on different sides of the compactor. This allows a smaller vehicle with a proper engagement hitch to push, pull, or otherwise maneuver the compactor from several different angles. As the casters engaging the base of the compactor are universal swivel casters, the compactor may be pushed, pulled or otherwise maneuvered in any direction once deployed from the transport vehicle. These embodiments allow for greater flexibility and deployability for a compactor having this form factor. These and other features become more apparent with respect to the following detailed descriptions with respect to FIGS. 1-5 below.

Figure 1:
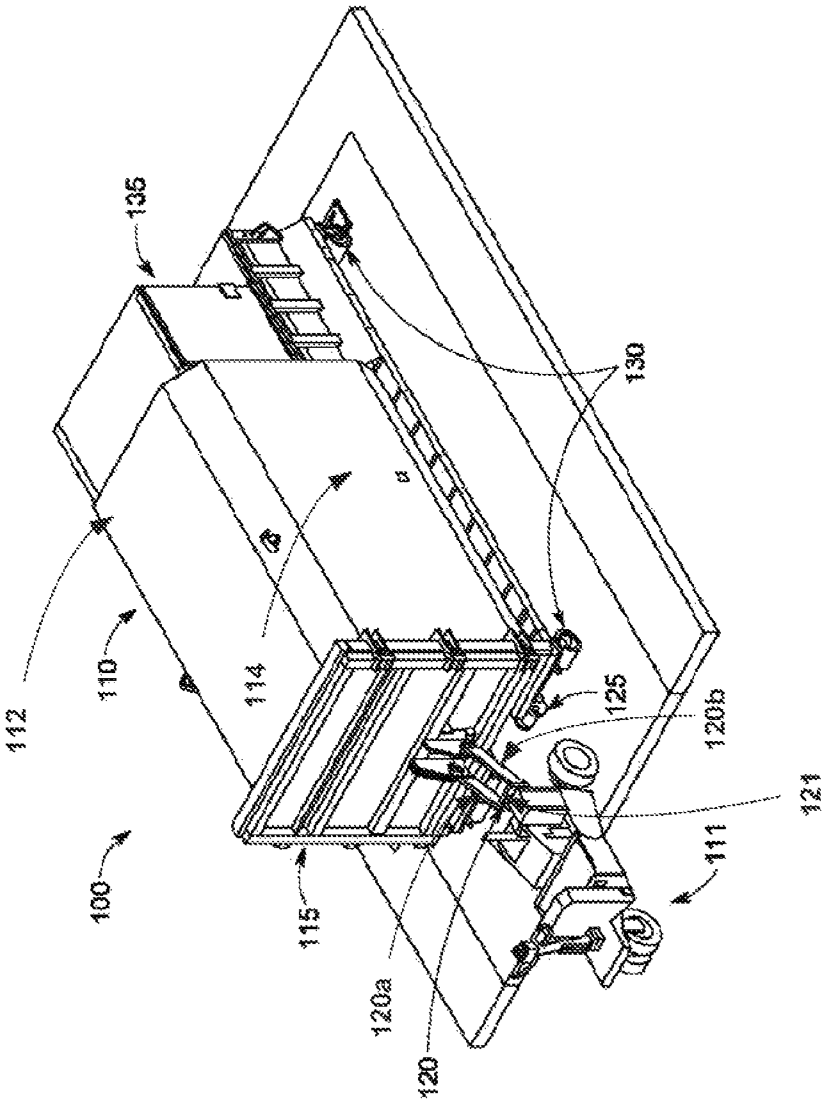
FIG. 1 shows an isometric diagram of a versatile compactor unit coupled to a deployment vehicle according to an embodiment of the subject matter disclosed herein.

FIG. 1 shows an isometric diagram of a system 100 that includes a versatile compactor unit 110 coupled to a deployment vehicle 111 according to an embodiment of the subject matter disclosed herein. Together, the deployment vehicle 111 and the compactor unit 110 form a versatile waste management system 100 that is better suited for use with tight spaces in metropolitan and industrial settings that lack space for maneuverability when using a transport vehicle (not shown). The compactor 110 includes a form factor including a receptacle body formed from receptacle walls to envelop a cavity that is generally rectangular in a manner that maximizes receptacle space while still offering a size suited for transport on a transport vehicle (not shown). That is, when the compactor unit 100 is being transported longer distances (e.g., to a dumping or transfer facility and back), a transport vehicle (e.g., a flatbed truck typically specialized for engaging and disengaging a compactor 100 according to embodiment herein) may pull the compactor, using a winch, up on its flatbed for transport. The transport vehicle equipment may be suited to engage the compactor 110 at engagement coupling members 125.

The form factor of this embodiment of the compactor 110 includes a forward-facing side 115 (called front side hereinafter) and a back side that form a shorter dimension of the rectangular unit. The terms forward or front and back are relative and are oriented with respect to a direction in which the compactor unit 110 can be towed by a deployment vehicle 111. The compactor 110 also includes two elongated sides as well as a top side and a base (bottom side). The base includes base support wheels 130 (e.g., casters) that are configured to allow for lateral motion of the compactor 110 in any direction. As a deployment vehicle 111 exerts a force on the compactor unit 110, the base support wheels 130 greatly reduce floor friction allowing for maneuvering of the compactor 110 after being deployed from the transport vehicle. In other embodiments, the base of the compactor unit 110 may include skid rails for ease of maneuvering onto a transport vehicle (not shown). Further, the deployment vehicle comprises a pair of rear wheels having a rear wheelbase and a pair of front wheels having a front wheelbase, where the front wheel base is smaller than the rear wheel base in order to facilitate greater maneuverability and versatility.

In order to facilitate the maneuverability of the compactor after deployment, the compactor 110 includes a front side tongue 120 mounted to the front side 115 of the compactor 110. In an embodiment, a front side tongue 120 comprises a first support member attached to the forward container wall 115 and emanating away from the forward container wall 115 at a first angle toward a tow point along a central axis of the container. The front side tongue 120 further comprises a second member attached to the forward container wall 115 and emanating away from the forward container wall 115 at a second angle toward the tow point. The front side tongue 120 further comprises a tow engagement mechanism coupled to the first member and the second member at the tow point wherein the first and second members converge at a tow member disposed at a distance from the forward container wall 115 that is equal to or less than one tenth of a length of the container. The disposition of the tow point at a relatively close in position allows for greater maneuverability of the compactor unit 110 by the deployment vehicle 111. In an embodiment, the dimension of the compactor unit 110 may be such that its length is two to five times as long as the width of the compactor unit. Further, the length of the tongue may be between ⅛$^{th}$ and 1⁄30$^{th}$ of the overall length of compactor unit 110.

Further, the front side tongue 120 includes a hitch receptacle mounted at an end of the first and second frame members that are typically rectangular, triangular, or trapezoidal. In the case of a rectangular tongue frame 120, the first and second members emanate from the forward container all 115 at 90-degree angles. Additionally, the ends of the frame members may be rotatably mounted to the front side 115 of the compactor 110. That is, the tongue 120 may be rotated down into a use position whereby a deployment vehicle 111 with a hitch may engage the hitch receptacle (e.g., the tow engagement mechanism) and maneuver the entire compactor 110. Likewise, the tongue 120 may be rotated up into a stowed position such that the tongue 120 is stowed away during non-use and does not interfere with other functionality of the compactor unit 110. Further, when the tongue frame 120 is rotated into a tow position, the tow point may sit lower than the base wall of the compactor unit 110.

The compactor 110 includes an inner receptacle for collecting and compacting waste. Generally, the receptacle includes an opening at the top side of the compactor 110 for receiving waste from above. In this embodiment, the compactor 110 combines the ability to safely store high-liquid content wastes in controlled environments with the conveniences and economics of compaction. Compaction may be achieved with a compaction actuator 135. Such a versatile compactor 110 featuring an ability to be maneuvered into tight spaces offering great benefits for deployment in shopping malls, supermarkets, large restaurants, resorts, hotels, hospitals and institutions. The portable and economical self-contained compactor 110 may also include remote power provisions designed for compacting and containing wet or dry waste and simplifying waste dumping. Such a compactor 110 helps maintain a sanitary environment, while saving money, for users generating as little as 20 cubic yards of refuse a week. Having increased maneuverability, the compactor 110 may be deployed wherever needed and whenever needed including temporary or permanent installations as there is no required anchoring, no required concrete pad, and no required special surfaces.

Figure 2:
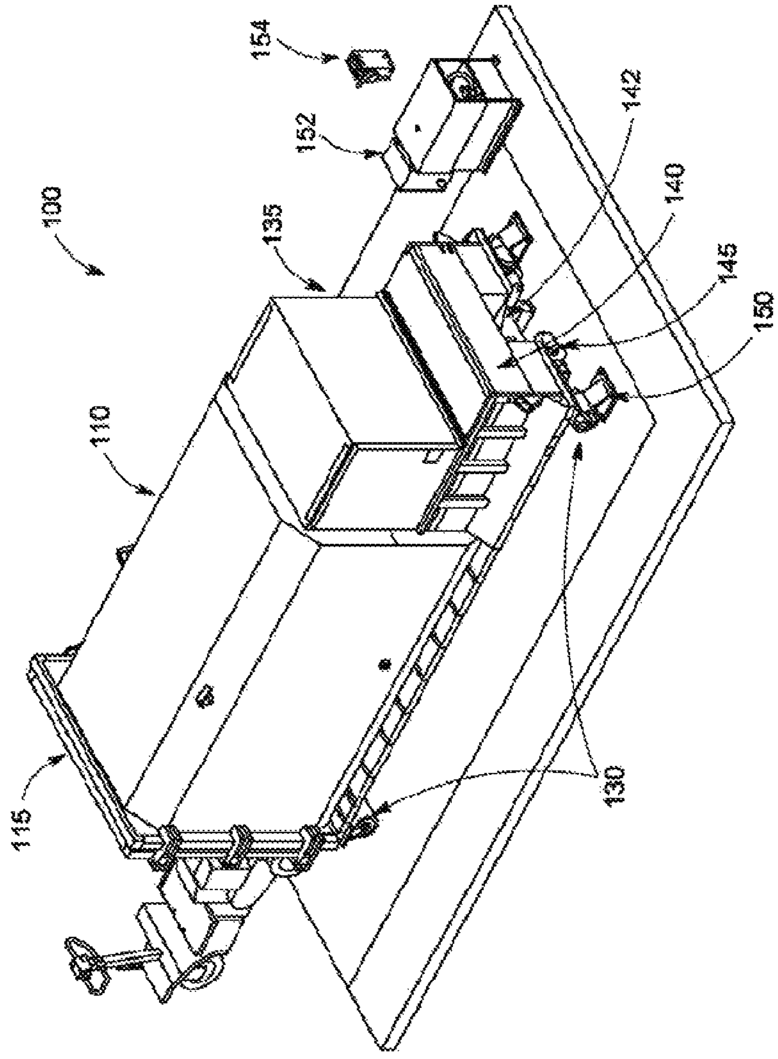
FIG. 2 shows another isometric diagram of the versatile compactor unit of FIG. 1 coupled to a deployment vehicle according to an embodiment of the subject matter disclosed herein.

FIG. 2 shows another isometric diagram of the versatile compactor unit 110 of FIG. 1 coupled to a deployment vehicle 111 according to an embodiment of the subject matter disclosed herein. Again, the compactor 110 and deployment vehicle 111 may be part of an overall waste management system 100 as previously described. In this additional view, the back side 140 of the compactor 110 may be seen in greater detail. Here, one can see back side engagement members 145 for use is collecting and deploying the compactor 110 from the bed of a transport vehicle (not shown). Much like the front side 115 having a front-side foldable tongue (now shown) for maneuverability, this embodiment of the compactor 110 may also include a backside 140 foldable tongue 142 that functions in a similar manner as discussed above.

As discussed above, the compactor 110 includes base support wheels 130 (e.g., casters) suited to assist with maneuverability. The compaction actuation unit 135 is also seen in this view. Further, the overall system 100 may include remote power 152 and control 154 units as well as back side wheel motion impeding members 150.

Figure 3:
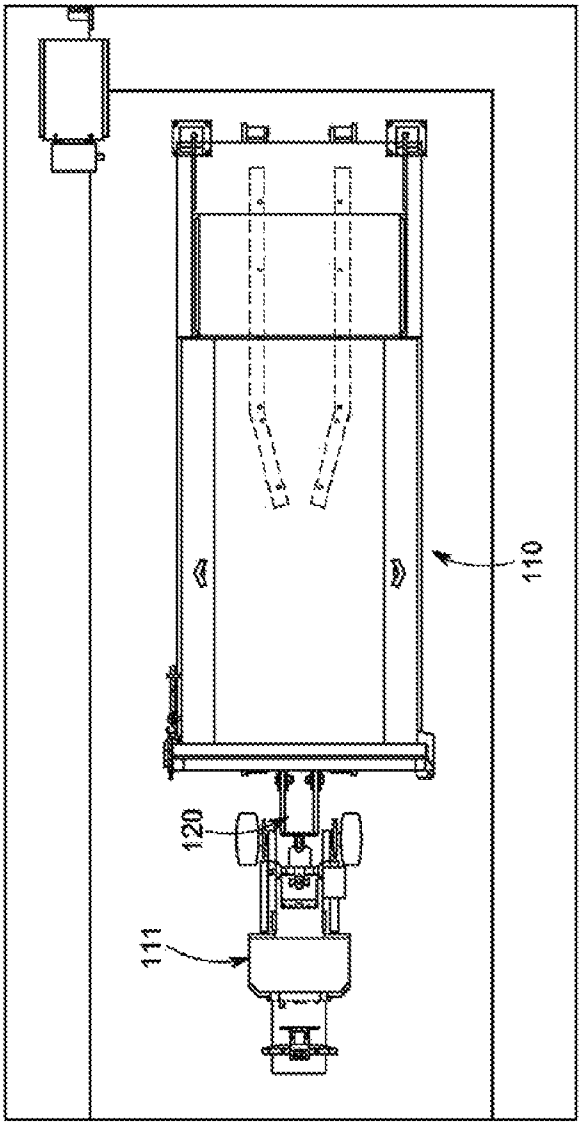
FIG. 3 shows a plan view of the versatile compactor unit of FIG. 1 coupled to a deployment vehicle according to an embodiment of the subject matter disclosed herein.

FIG. 3 shows a plan view of the versatile compactor unit 110 of FIG. 1 coupled to a deployment vehicle 111 according to an embodiment of the subject matter disclosed herein. In this view, specific dimensions and configuration may be more readily apparent. The compactor 110 comprises a length of approximately 19 feet from front side to back side and a width of approximately eight feet from side wall to side wall. This allows the compactor 110 to be deployed in compact spaces approximately 30 feet in length and 12 feet in width. This also allows for remote power units 152 and remote-control units 154 to be present. The space also allows for the foldable tongue 120 to be deployed to its 25-inch length for engaging the hitch of the deployment vehicle 111. Further, one can see in this plan view the presence of special 10-foot guiderails (e.g., skid rails) with separate stops disposed on the bottom side of the compactor 110. The dimensions used herein are but one embodiment as the dimensions and aspects of a versatile compactor unit 110 may be suited to any desirable size and overall shape.

Figure 4:
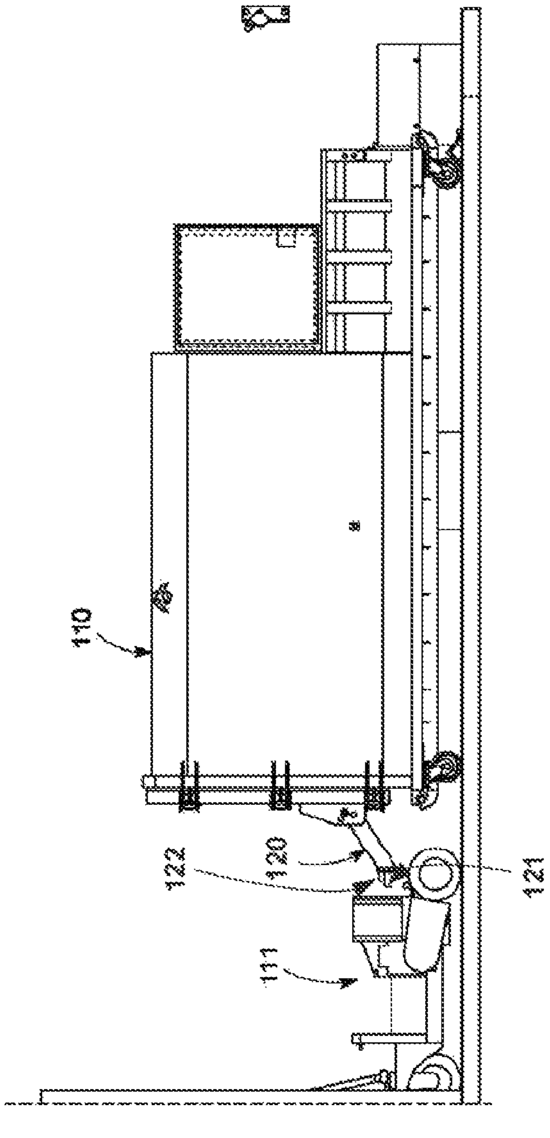
FIG. 4 shows a side view of the versatile compactor unit of FIG. 1 coupled to a deployment vehicle according to an embodiment of the subject matter disclosed herein.

FIG. 4 shows a side view of the versatile compactor unit 110 of FIG. 1 coupled to a deployment vehicle 111 according to an embodiment of the subject matter disclosed herein. This view affords a better opportunity to see the casters 130. The casters 130 comprise heavy-duty wheel casters that are kingpin-less and feature a full-swivel range of motion. The caster may be 10-inch diameter with 4-inch-wide wheels made from high-impact resistance polyurethane. The casters 130 provide the compactor 110 with a low-profile clearance of eight inches and an overall low-profile height of 110-inches floor to top.

Figure 5:
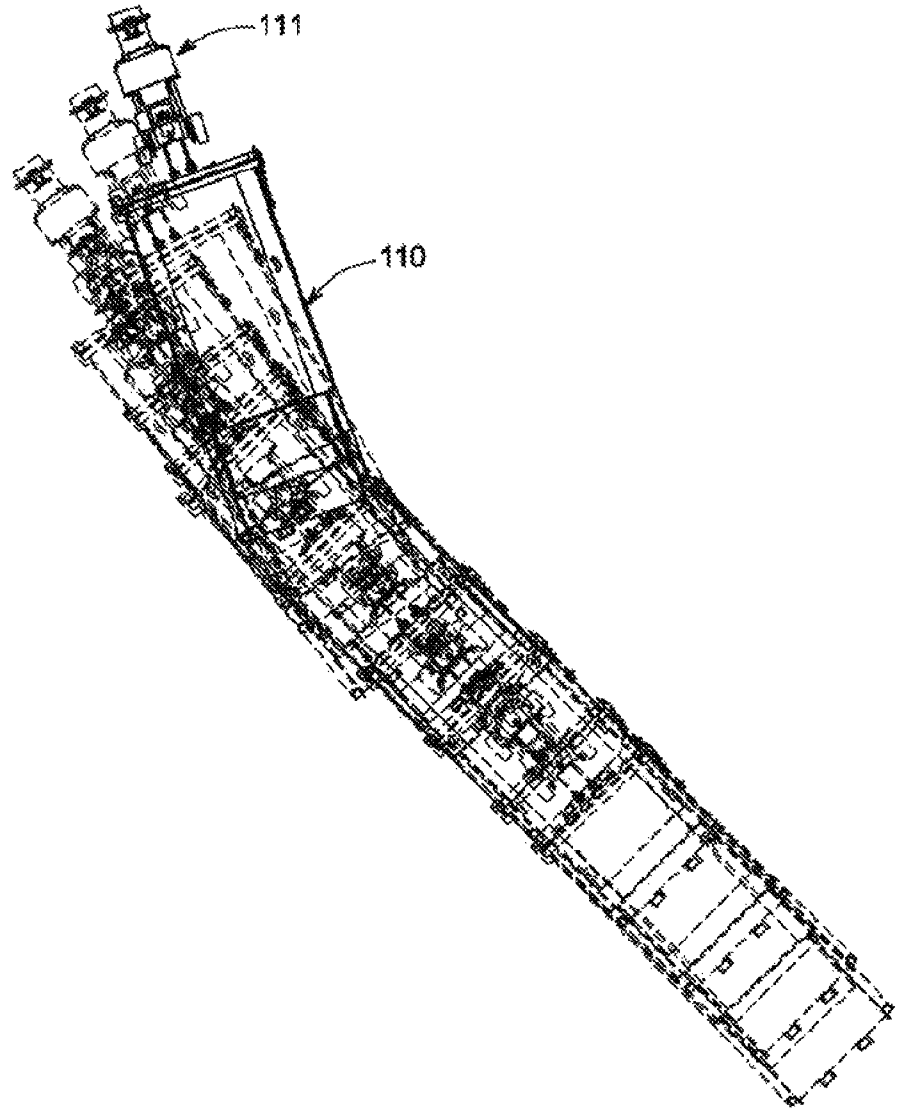
FIG. 5 shows an in-motion illustration of the versatile compactor unit of FIG. 1 coupled to a deployment vehicle according to an embodiment of the subject matter disclosed herein.

FIG. 5 shows an in-motion illustration of the versatile compactor unit 110 of FIG. 1 coupled to a deployment vehicle 111 according to an embodiment of the subject matter disclosed herein. In this figure, one can see the increased versatility in maneuvering the compactor 110 in and out of tight spaces as discussed above. As was described above, the length of the versatile compactor unit 110 is approximately 30 feet and its width is approximately 12 feet. With the use of the front-side tongue 125, a deployment vehicle 111 is capable of maneuvering the versatile compactor unit 110 at least 45 degrees in an alleyway (or other similarly limited space) of 20 feet in width. That is, the deployment vehicle 111 can clear a 20-foot width and still push the versatile compactor unit 110 to a 45-degree angle without impacting any barrier (e.g., the next building) when the maneuvering is taking place.

In other embodiments, the dimensions discussed may be different, but the underlying tenets of the inventive concepts remain. Namely, the versatile compactor unit 110 may be maneuvered at angles by a deployment vehicle in tight alley ways because of the placement of the front-side tongue 125 and/or the back-side tongue.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

What is claimed is:

1. A container, comprising:

a receptacle body configured to receive waste in a cavity surrounded by container walls;

a mechanized compactor positioned within the receptacle body;

a first tongue affixed to a forward container wall of the container walls, the first tongue including a first support member attached to the forward container wall and emanating away from the forward container wall at a first non-zero angle downwardly toward a first tow point along a central axis of the container and away from the forward container wall;

a second support member attached to the forward container wall and emanating away from the forward container wall at a second non-zero angle downwardly toward the first tow point; and a first tow engagement mechanism coupled to the first support member and the second support member at the first tow point;

wherein the first and second support members converge at the first tow point disposed at a distance from the forward container wall that is equal to or less than one tenth of a length of the container; and a second tongue affixed to a back container wall of the container walls, the second tongue including a third support member attached to the back container wall and emanating away from the back container wall at the third non-zero angle downwardly toward a second tow point along a central axis of the container and away from the back container wall;

a fourth support member attached to the back container wall and emanating away from the back container wall at the fourth non-zero angle downwardly toward the second tow point; and a second tow engagement mechanism coupled to the third support member and the fourth support member at the second tow point.

2. The container of claim 1, wherein the receptacle body comprises a maneuverable top wall that encloses the mechanized compactor within the receptacle body.

3. The container of claim 1, wherein the first tow point is disposed at a distance from the forward container wall such that the length of the receptacle body is twenty times the distance.

4. The container of claim 1, wherein the container further comprises a length that is two to five times as long as a width of the receptacle body.

5. The container of claim 1, further comprising casters disposed on a bottom wall.

6. The container of claim 1, further comprising skids disposed on a bottom wall.

7. The container of claim 1, wherein the first support member and the second support member emanate at a 90-degree angle from the forward container wall and each intersect the first tow point.

8. The container of claim 1, wherein the first tow point is disposed at a lower level with respect to the first and second support members are attached to the forward container wall.

* * * * *